Figure 9:
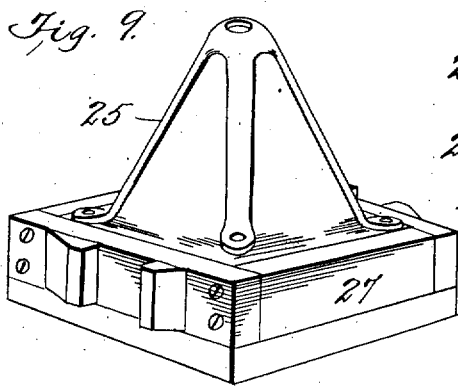

No. 850,168. PATENTED APR. 16, 1907.
A. R. MARSTELLER.
MOLDING PROCESS.
APPLICATION FILED DEC. 10, 1906.
5 SHEETS—SHEET 1.
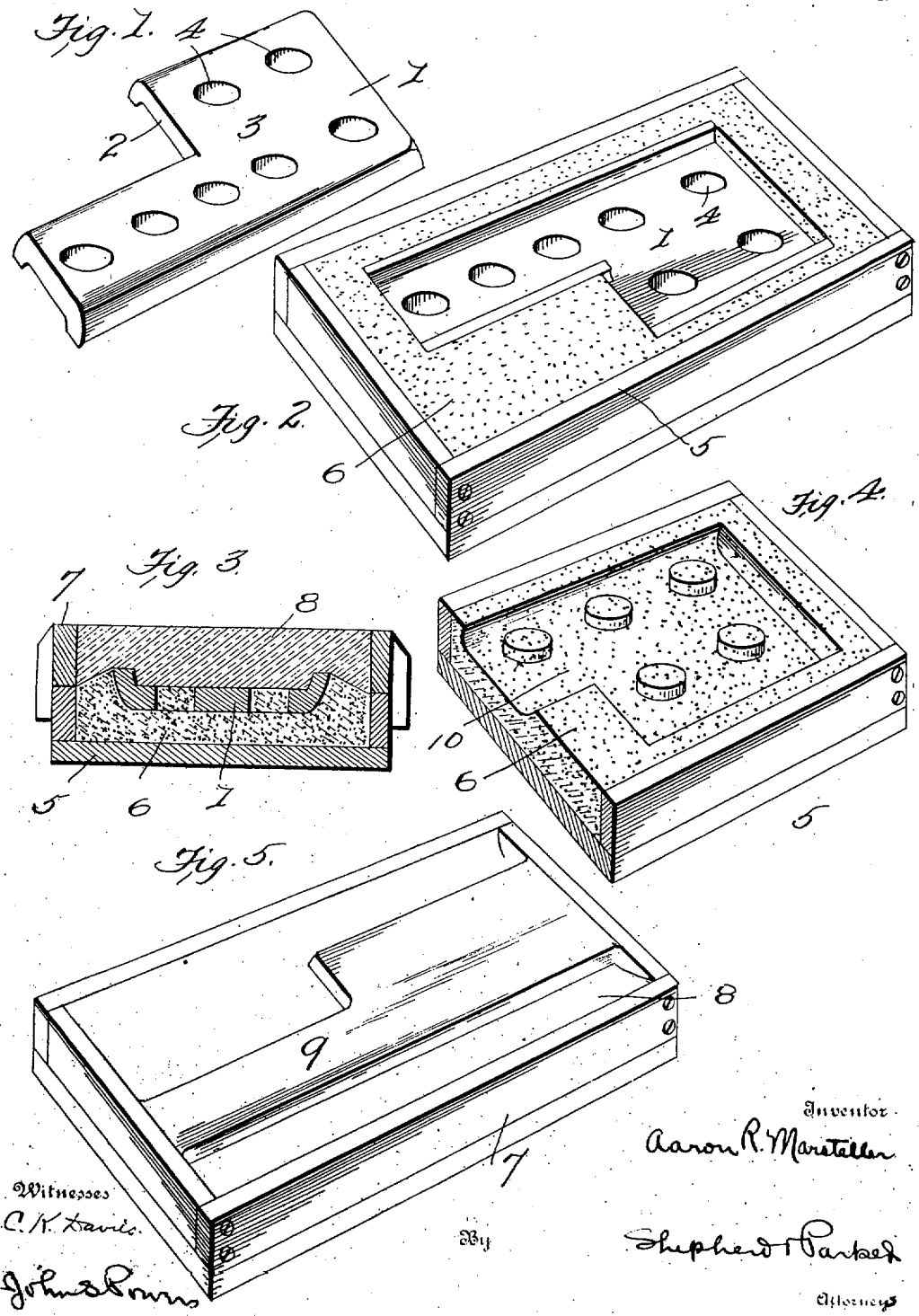

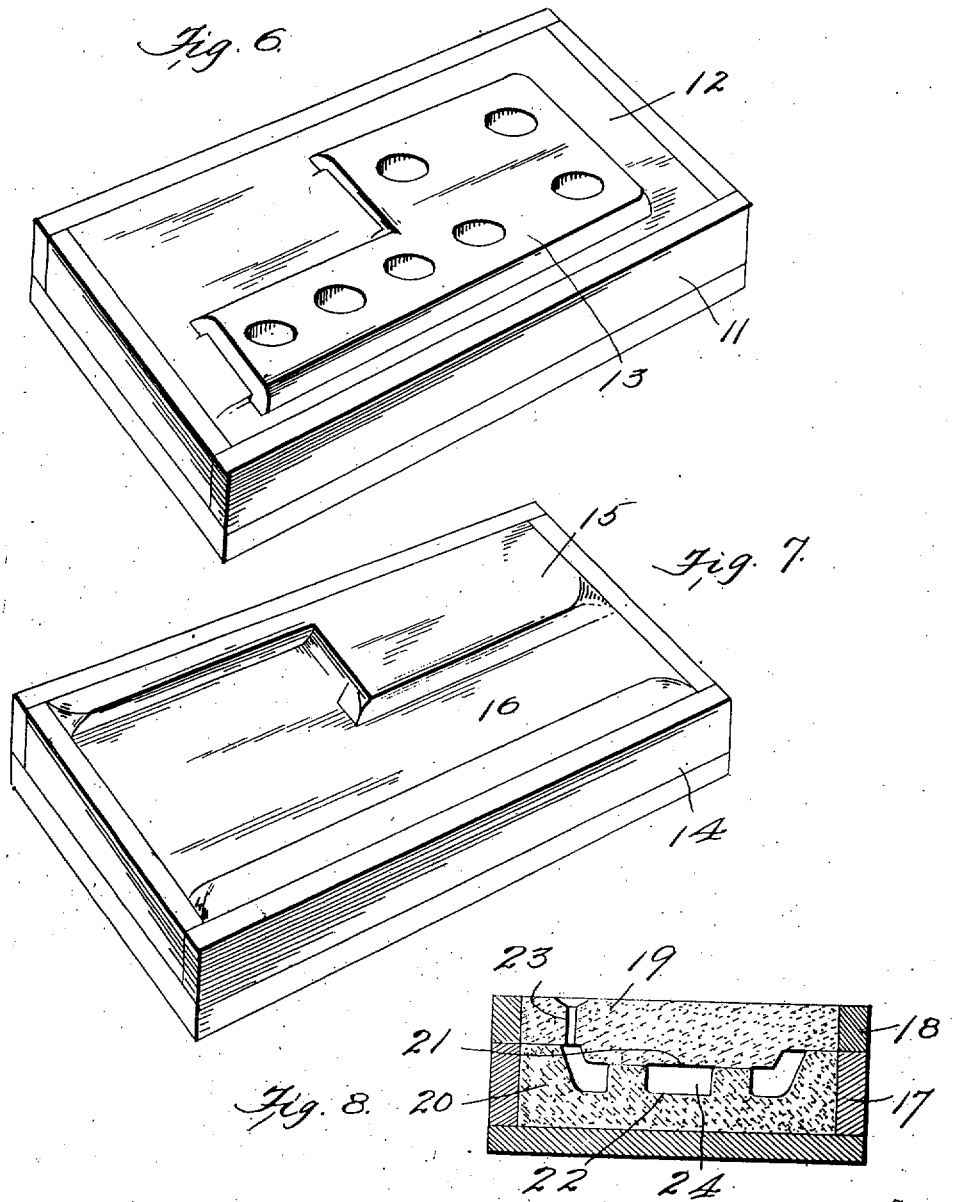

No. 850,168. PATENTED APR. 16, 1907.
A. R. MARSTELLER.
MOLDING PROCESS.
APPLICATION FILED DEC. 10, 1906.

5 SHEETS—SHEET 3.

Witnesses.
Chas K Davies
John D Towns

Inventor.
Aaron R Marsteller
by Shepherd & Parker
Attorneys.

No. 850,168. PATENTED APR. 16, 1907.
A. R. MARSTELLER.
MOLDING PROCESS.
APPLICATION FILED DEC. 10, 1906.
5 SHEETS—SHEET 4.
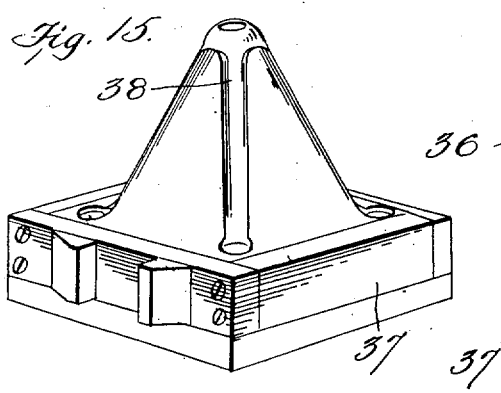
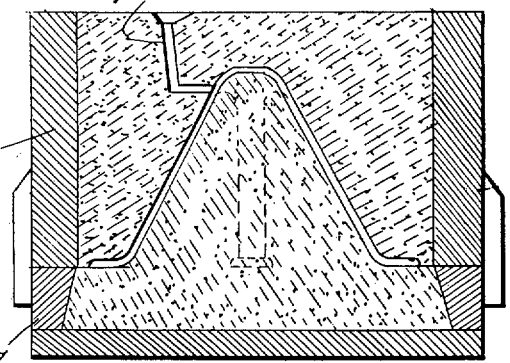
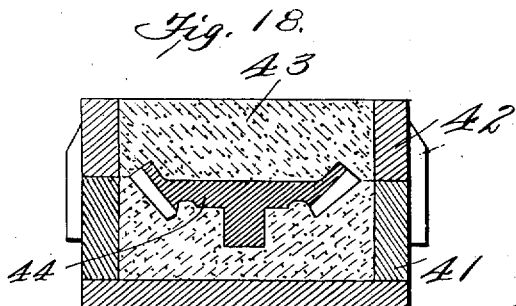
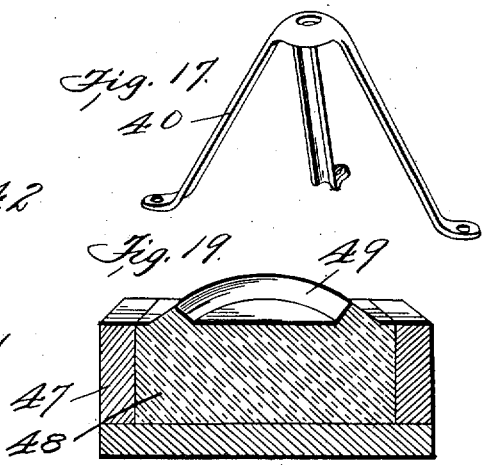
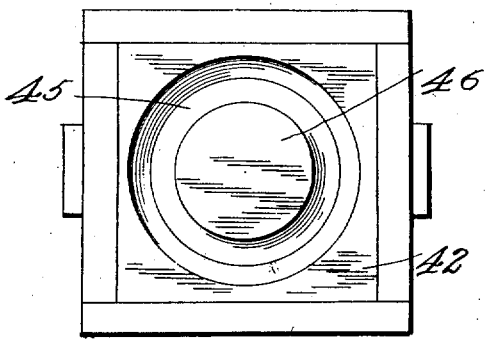
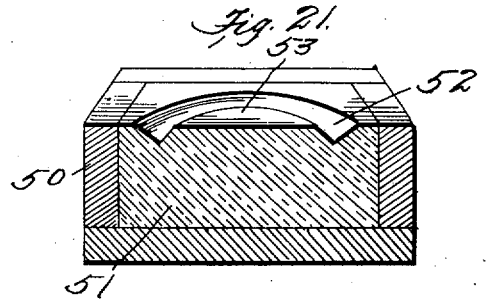
Witnesses.
Chas. K. Davies
John B. Bowers
Inventor.
Aaron R. Marsteller
by Shepherd Parker
Attorneys No. 850,168. PATENTED APR. 16, 1907.
A. R. MARSTELLER.
MOLDING PROCESS.
APPLICATION FILED DEC. 10, 1906.
5 SHEETS—SHEET 5.
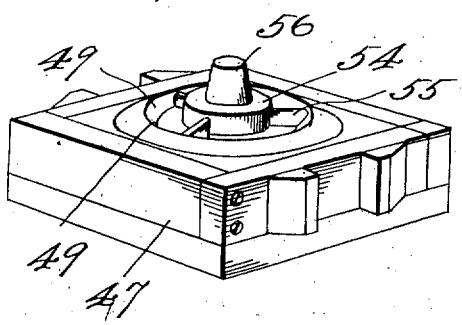
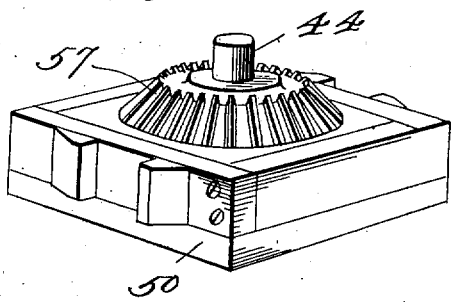
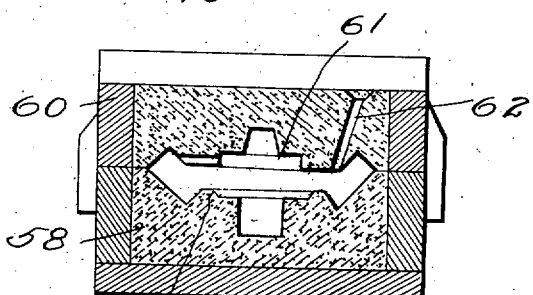
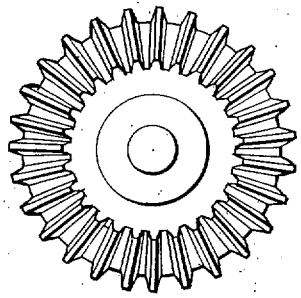
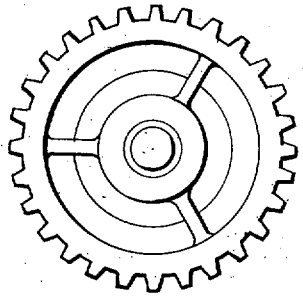
Witnesses.
Chas. K. Davis.
John S. Bowers
Inventor.
Aaron R. Marsteller
by
Shepherd Barker
Attorneys.

UNITED STATES PATENT OFFICE.

AARON R. MARSTELLER, OF ST. LOUIS, MISSOURI.

MOLDING PROCESS.

No. 850,168.

Specification of Letters Patent.

Patented April 16, 1907.

Application filed December 10, 1906. Serial No. 347,151.

*To all whom it may concern:*

Be it known that I, AARON R. MARSTELLER, a citizen of the United States, residing at St. Louis, and State of Missouri, have invented certain new and useful Improvements in Molding Processes, of which the following is a specification.

This invention relates to molding processes, and has particular reference to durable matrices having the positive contour or impression for the pattern to be reproduced and from which molds of sand or other material may be directly formed.

The invention further contemplates a process of producing said matrices and molds of sand or other material therefrom.

The primary object of the present invention is to effect a saving of time, labor, and expense in metal and other molding, and these objects are attained in this process, first, by the provision or means whereby two or more sets or gangs of men can by the employment of durable matrices work in the formation of molds from a single pattern and produce such molds from the said matrices with the minimum effort on the part of the operators.

In the practice of my invention it is preferred to construct the durable matrices above referred to of the composition described in my prior patent, No. 785,862. The chief ingredients of this composition are sand, oil, litharge, and asphaltum, and when these ingredients are treated in the manner set forth in said patent the result is a solidified mass which is plastic, elastic, and yet durable, retaining permanently the impression which may be formed therein in carrying out my process.

In its broadest aspect the invention resides in the following steps: first, in taking negative impressions of the original pattern in sand or in composition, then in taking from the sand or composition thus impressed positive impressions, these cast impressions being made in the above-referred-to durable matrices, and finally in constructing the mold for making the finished article from said matrices.

The details of construction of my durable matrices, as well as the nature of my process, will be apparent from the following description, in which reference is had to the accompanying drawings, forming a part of this specification, like numerals designating like parts throughout the several views, wherein—

Figure 1 is a perspective view of a pattern which may be employed in carrying out my invention. Figs. 2, 3, 4, 5, 6, 7, and 8 are views representing the various steps in the formation of the sand mold and will be hereinafter specifically referred to. Fig. 9 is a perspective view of another form of pattern. Figs. 10, 11, 12, 13, 14, 15, and 16 are views illustrating a modified method of carrying out the process which may be employed in connection with the pattern shown in Fig. 9. Fig. 17 is a perspective view of a tripod molded in accordance with the adaptation of the process illustrated in Figs. 10 to 16. Figs. 18, 19, 20, 21, 22, 23, and 24 are views illustrating the application of my improved process to the formation of molds for very fine work in which the dimensions of the finished product must be perfectly accurate, and Figs. 25 and 26 are plan views of the two faces of the product constructed in accordance with the adaptation of the process shown in Figs. 18 to 24.

The various figures above noted will be hereinafter specifically referred to as the description proceeds, and the steps involved will be set forth with reference thereto.

In Fig. 1 I have illustrated a pattern of a fish-plate. This pattern is designated by the numeral 1 and has a concave side 2, a convex side 3, and openings 4. In Fig. 2 the numeral 5 designates a box or flask which is filled with mold-sand 6. The pattern 1 is placed in the flask 5 in the manner commonly practiced in the art in making the drag half of a mold, as illustrated in Fig. 2. In Fig. 3 a cope 7 is shown as superimposed on the flask 5 and pattern 1. The cope 7 contains a plastic composition 8, which as it hardens takes the negative form of the concave side 2 of the pattern 1. After the plastic composition has received its impression in this and in the other instances of its use, as hereinafter recited, it is hardened by heating or drying, as fully described in my Patent No. 785,562 before mentioned. The cope 7, with its composition filling 8, is illustrated in Fig. 5, the negative surface of the pattern being designated by the numeral 9. When the cope is removed from the flask, the sand 6 has the negative impression of the convex side of the pattern 1. This impression is clearly shown in Fig. 4 and is designated by the numeral 10. The flask 5, having had its material 6 thus shaped to form the negative of the convex side of the pattern, is used to form a positive impression of the convex side of the pattern. In this step a cope 11, having a composition filling 12, is employed and is superimposed directly on the flask 5, the filling 12 being tamped down, so that when it hardens its surface exhibits a positive impression or form of the convex side 3 of the pattern. This positive surface of the composition 12 is indicated by the numeral 13 in Fig. 6. A cope 14 is likewise superimposed upon the cope 7, previously referred to. The cope 14 has a composition filling 15, which on account of the negative contour or surface 9 of the filling 8 of the cope 7 assumes a positive impression or contour 16, corresponding to the concave face 2 of the pattern 1. The copes 11 and 14 thus form durable composition mold matrices or dies, from which the drag 17 and the cope 18 of the final mold are respectively constructed. The cope 18 and drag 17 are illustrated in Fig. 8 and comprise the mold-sand 19 and 20, having the negative impressions of the respective concave and convex sides of the pattern 1, such impressions being designated by the numerals 21 and 22. The cope 18 has an opening 23 formed in the sand filling 19, through which the molten metal is introduced, such metal filling the space 24 between the surfaces 21 and 22 and having the shape and proportions of the original pattern. It will thus be apparent that any number of composition mold matrices or dies 11 and 14 may be formed from a single pattern in the manner described and that a corresponding number of workmen may be employed in preparing the final molds therefrom.

From the positive mold-matrices 11 and 14 may be formed durable composition molds wherein may be molded terra-cotta or other plastic material. It is also to be understood that the mold-matrices 11 and 14 may be employed in molding-machines in place of patterns or pattern-sections.

Fig. 9 illustrates a tripod-pattern designated by the numeral 25. The pattern 25 is used for molding skeleton frames, such as hangers, wagon-irons, and fifth-wheel bearings. The pattern 25 as disclosed is pyramidal or cone-shaped in form and is supported upon and conformable with the sand filling 26 of the flask 27.

Figure 10:
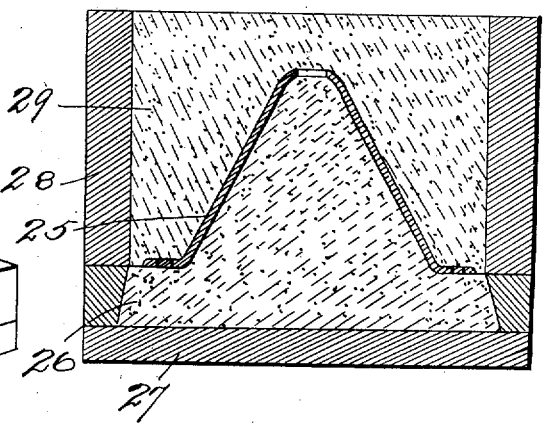

In Fig. 10 is illustrated a step in the process which corresponds to the disclosure of Fig. 5. Instead of a composition cope 8 a cope 28, having a mold-sand filling 29, may be employed. The use of composition or a sand filling will of course depend on the conditions of use.

Figure 11:
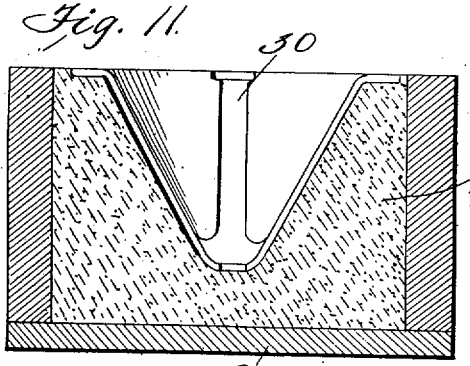
Figure 12:
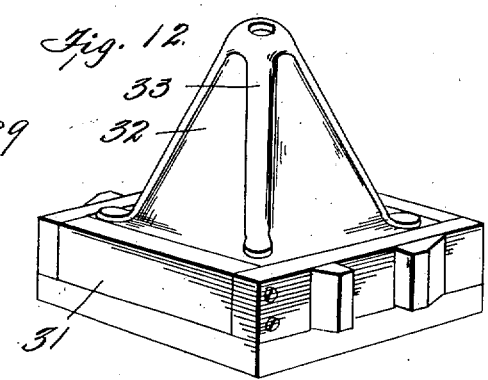
Figure 13:
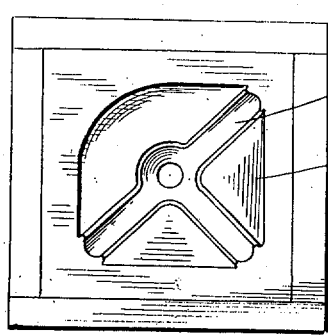
Figure 14:
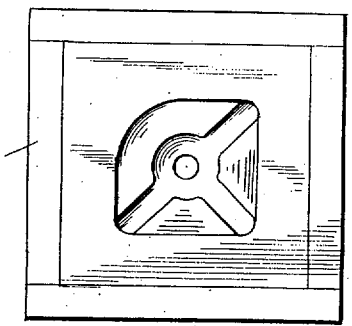

In the next step the cope 28 serves as a flask, as is shown in Fig. 11, the sand therein having the impression 30 in negative of the pattern 25. A cope 31, having a composition filling 32, is superimposed upon the cope 28, the filling 32 being forced into the impression 30, and thus assume the positive contour 33 of the pattern 25. The next step consists in forming a composition cope 34 from the cope 27, the pattern 25 being removed. This step produces the cope shown in Fig. 13, which has the projections 35, corresponding to the recesses in the sand 26 of the cope 27, which are formed by the pattern 25. From the composition matrix 33 the sand cope 36 (illustrated in Fig. 14) is formed. From the composition pattern 34, which has the impression of the under side of the pattern 25, the sand drag 37 is formed. The cope 36 is superimposed upon the flask 37, as is shown in Fig. 16. The sand of the cope 36 has an opening 39 therein, through which the molten metal is introduced.

Fig. 17 represents the finished product 40 of the mold shown in Fig. 16.

Figs. 18 to 24 illustrate my improved process adapted for use in making cog-wheels and other objects where the details must be reproduced with great exactness. In Fig. 18 I have illustrated the drag 41 and the cope 42 in superposed relation, having a filling of sand 43, which takes the impression of the pattern 44, inserted in the drag 41. The pattern 44 represents a bevel-pinion projecting above the drag 41 from the rear angle of its teeth. An annular recess 45 is thus formed in the sand 43 of the cope 42, within which is a central portion 46, concentric therewith and flush with the surrounding material. The cope 42 having been thus treated is inverted and used as a drag in connection with a cope 47, having a composition filling 48. The cope 47 is illustrated in Fig. 19, and the filling 48 after being tamped into the recess 45 takes the surface form of an annular elevation or bead 49, conformable in shape to said recess. Then in like manner the cope 47 is used as a drag in connection with a cope 50, having a composition filling 51, which being pressed upon the bead 49 has a surface formation of an annular groove or recess 52, within which is a concentric raised portion 53. The cope 50 is illustrated in Fig. 21, and its material has the same impression as that of the cope 42. (Illustrated in Fig. 20.) From the copes 47 and 50 the sand mold has its cope and drag formed. This step is illustrated in Figs. 22 and 23, showing the respective uses of the copes 47 and 50, which are now employed as drags. The impression of the rear surface of the pinion is made in negative from the cope 47. This is effected by placing within the space inclosed by the groove 49 a pattern 54, having the conformation of the rear side of the pinion to be molded and being accordingly provided with ribs 55 and a boss 56. The original pattern 44 is placed with its rearwardly-projecting portion in the recess 52 in the material of the cope 50. This step is shown in Fig. 23, and it is to be noted that the bevel-teeth 57 on the front face of the pattern are exposed.

From the copes 47 and 50, with the patterns 54 and 44, respectively, therein, we obtain the sand mold illustrated in Fig. 24. The drag 58 of the sand mold is made from the cope 50, and its material has the surface impression 59 in negative of the front face of the pattern 44. The sand-mold cope 60 is formed from the cope 47 in the manner described, and its material has the impression 61 in negative of the projecting parts on the surface of the cope 47 and of the pattern 54 inclosed therein. The cope 60 is superimposed on the drag 58, and its material has an opening therethrough through which the metal to be shaped is introduced. The finished gear-wheel is illustrated in Figs. 25 and 26, in which the front and rear faces, respectively, as formed by the mold shown in Fig. 24 are illustrated.

While I have described my invention specifically in connection with three embodiments thereof, it is to be understood that said invention is not limited to the exact details mentioned, but may be variously modified within the scope of the appended claim.

Having fully described my invention, I claim—

The herein-described process of producing molds which consists in first embedding a pattern in molding-sand leaving one side of the pattern exposed, tamping plastic material adapted to be hardened, upon said exposed side, said sand and plastic material receiving in negative the impression of the opposite sides of the pattern, hardening said plastic material, then tamping upon the impressed surfaces thus formed plastic material adapted to be hardened, said last-named plastic material receiving positive impressions of the sides of said pattern, hardening said plastic material to produce durable rigid matrices and finally in producing the drag and cope halves of a mold from said matrices, substantially as described.

In testimony whereof I affix my signature in presence of two witnesses.

AARON R. MARSTELLER.

Witnesses:
N. L. THOMPSON.
S. J. BLOCK.